United States Patent
Schneider et al.

(10) Patent No.: US 10,214,169 B2
(45) Date of Patent: Feb. 26, 2019

(54) BUMPER-REINFORCING SYSTEM FOR MOTOR VEHICLE

(71) Applicant: ArcelorMittal, Luxembourg (LU)

(72) Inventors: Nicolas Schneider, Saint-Martin-Longueau (FR); Elie Gibeau, Pont-Sainte-Maxencef (FR); Yves Drouadaine, Pontoise (FR); Arnaud Cocu, Cires-les-Mello (FR); Gilson Donya, Nanterre (FR)

(73) Assignee: ARCELORMITTAL, Luxembourg (LU)

( * ) Notice: Subject to any disclaimer, the term of this patent is extended or adjusted under 35 U.S.C. 154(b) by 0 days.

(21) Appl. No.: 15/511,099

(22) PCT Filed: Sep. 22, 2015

(86) PCT No.: PCT/IB2015/001670
§ 371 (c)(1),
(2) Date: Mar. 14, 2017

(87) PCT Pub. No.: WO2016/046619
PCT Pub. Date: Mar. 31, 2016

(65) Prior Publication Data
US 2017/0274851 A1 Sep. 28, 2017

(30) Foreign Application Priority Data
Sep. 22, 2014 (WO) .................. PCT/IB2014/001904

(51) Int. Cl.
*B60R 19/18* (2006.01)
*B60R 19/24* (2006.01)
*B60R 19/34* (2006.01)

(52) U.S. Cl.
CPC .............. *B60R 19/18* (2013.01); *B60R 19/24* (2013.01); *B60R 19/34* (2013.01);*B60R 2019/186* (2013.01); *B60R 2019/1806* (2013.01); *B60R 2019/1813* (2013.01); *B60R 2019/1826* (2013.01); *B60R 2019/247* (2013.01)

(58) Field of Classification Search
CPC ......... B60R 19/18; B60R 19/24; B60R 19/34; B60R 2019/1806; B60R 2019/1813;
(Continued)

(56) References Cited

U.S. PATENT DOCUMENTS

| 7,503,603 B2 | 3/2009 | Braunbeck et al. |
| 2013/0119683 A1* | 5/2013 | Blumel .................. B21D 53/88 293/133 |

(Continued)

FOREIGN PATENT DOCUMENTS

| CN | 102180135 A | 9/2011 |
| CN | 202827752 U | 3/2013 |

(Continued)

*Primary Examiner* — Hilary L Gutman
(74) *Attorney, Agent, or Firm* — Davidson, Davidson & Kappel, LLC

(57) ABSTRACT

A bumper-reinforcing system (1) intended for a motor vehicle includes:
a bumper beam (2) with a single-piece elongated profile with a closed cross section and including a center zone (21) extending at least over part of the entire width of the bumper beam and an end zone (22) at each extremity of the bumper beam,
two bumper fasteners (3) connected to the rear side of the bumper beam (2) at the intersection between the center zone (21) and the end zone (22) of the bumper beam (2),
two reinforcing tubes (4) connected by their first end to the rear side of the end zone (22) of the bumper beam (2), extending from the bumper beam (2) so as to form an angle α below 45° with the vertical plane of symmetry of the bumper beam and suited to be connected by their other end on the front rail of the vehicle for which the bumper-reinforcing system (1) is provided, and (Continued)

two covers (5) with a single-piece elongated profile with an open cross section, in contact with the rear side of the end zone (22) of the bumper beam (2) and extending at least from the first end of one of the reinforcing tubes (4) to one of the bumper fasteners (3).

16 Claims, 2 Drawing Sheets

(58) Field of Classification Search
CPC ...... B60R 2019/1826; B60R 2019/186; B60R 2019/247
See application file for complete search history.

(56) References Cited

U.S. PATENT DOCUMENTS

| | | |
|---|---|---|
| 2014/0008923 A1 | 1/2014 | Han et al. |
| 2014/0091585 A1 | 4/2014 | Ramoutar et al. |
| 2015/0298634 A1* | 10/2015 | Hara ...................... B60R 19/34 293/133 |
| 2015/0329144 A1* | 11/2015 | Hara .................... B62D 21/152 296/187.09 |
| 2016/0177414 A1* | 6/2016 | Takashima ............... C21D 9/46 148/652 |
| 2017/0001588 A1* | 1/2017 | Kurihara ................. B60R 19/56 |
| 2017/0204491 A1* | 7/2017 | Kawasaki ................ C21D 9/46 |
| 2017/0218475 A1* | 8/2017 | Kawasaki ................ C21D 9/46 |
| 2017/0247056 A1* | 8/2017 | Viaux .................... B62D 21/02 |
| 2017/0259769 A1* | 9/2017 | Kurihara ................. B60R 19/56 |

FOREIGN PATENT DOCUMENTS

| | | |
|---|---|---|
| JP | 2004352101 A | 12/2004 |
| JP | 2013169875 A | 9/2013 |
| RU | 2368527 C2 | 9/2009 |
| RU | 2422304 C2 | 6/2011 |
| WO | 2012016692 A1 | 2/2012 |
| WO | 2014088117 A1 | 6/2014 |
| WO | 2014112596 A1 | 7/2014 |
| WO | 2014173476 A1 | 10/2014 |

\* cited by examiner

BUMPER-REINFORCING SYSTEM FOR MOTOR VEHICLE

The present invention concerns a bumper-reinforcing system for motor vehicle.

BACKGROUND

There is a general demand for motor vehicle body structures which provide a high degree of safety for the occupants during collisions and other situations involving very high loads due to impact forces acting on the vehicle.

In order to obtain a high degree of safety for the occupants of a vehicle, the body structure of the vehicle must be designed so as to provide a high strength and resistance to impact forces, by absorbing and distributing the impact forces in an effective manner. This is generally achieved by means of various reinforcement structures and components in the vehicle.

In particular, the front bumper system generally includes a bumper beam and crash boxes arranged at the ends of the bumper beam. The crash boxes, in turn, are fixed on longitudinal members of the motor vehicle. In case of head-on collision, crash energy is diverted via the bumper beam to the crash boxes which undergo a deformation to at least in part absorb the crash energy.

Recently-there was a new crash test introduced in the United States replicating what happens when the front corner of a vehicle collides with another vehicle or an object like a tree or utility pole (Small Overlap Rigid Barrier or SORB test).

Small overlap frontal crashes primarily affect a vehicle's outer edges which are not well protected by the front bumper system. Crash forces go directly into the front wheel, suspension system and firewall. It is not uncommon for the wheel to be forced rearward into the footwell, contributing to even more intrusion in the occupant compartment and resulting in serious leg and foot injuries.

SUMMARY OF THE INVENTION

There is thus a need for reinforced front bumper systems contributing to a reduced intrusion in the occupant compartment in case of small overlap frontal crashes.

In the meantime, it is desirable to reduce the overall weight of the vehicle, in order to reduce the energy consumption of the vehicle, so as to meet the future environmental requirements. The reinforced front bumper systems should thus not jeopardize the achievement of the weight-reduction objectives.

It is already known from WO2014/112596 and WO2014/088117 to add a reinforcing tube connected by its first end to the end zone of the bumper beam and connected by its other end on the front rail of the vehicle. Nevertheless in case of small overlap frontal crash, the specific design of the bumper beam does not allow maintaining the structural integrity of its end zone and the front rail is severely bended.

It is an object of the present invention to solve the above-mentioned problems and, in particular, to provide a bumper-reinforcing system contributing to a reduced intrusion in the occupant compartment in case of small overlap frontal crashes. Another alternate or additional object of the present invention is to limit as much as possible the weight increase of the bumper-reinforcing system.

To that end, the present invention relates to a bumper-reinforcing system intended for a motor vehicle comprising:

a bumper beam with a single-piece elongated profile with a closed cross section and including a center zone extending at least over part of the width of the bumper beam and an end zone at each extremity of the bumper beam, two bumper fasteners connected to the rear side of the bumper beam at the intersections between the center zone and the end zones of the bumper beam, two reinforcing tubes connected by their first end to the rear side of the end zone of the bumper beam, extending from the bumper beam so as to form an angle $\alpha$ below 45° with the vertical plane of symmetry of the bumper beam and suited to be connected by their other end on the front rail of the vehicle for which the bumper-reinforcing system is provided, two covers with a single-piece elongated profile with an open cross section, in contact with the rear side of the end zone of the bumper beam and extending at least from the first end of one of the reinforcing tubes to one of the bumper fasteners.

According to other advantageous aspects of the present invention, the bumper-reinforcing system comprises one or more of the following features, considered alone or according to any technically possible combination:

the bumper-reinforcing system comprises two front rails connected to the bumper fasteners and two suspension arm brackets extending outwards from the front rails, the reinforcing tubes are connected by their other end at the junction between the front rails and the suspension brackets, the front rail comprises a front part made of steel having a tensile strength comprised between 450 and 1150 MPa and a total elongation above 8% and a rear part made of a fully martensitic steel, obtained by press hardening, with a tensile strength comprised between 1400 and 2000 MPa and a carbon content comprised between 0.15 and 0.5 wt %, the reinforcing tube does not protrude from the end of the bumper beam in the longitudinal direction of the bumper beam, the reinforcing tube is made of a dual-phase steel with a tensile strength between 780 and 900 MPa, the reinforcing tube is a hollow tube having a circular cross section, the bumper beam has a B-shaped cross section, the bumper beam comprises a web and two legs extending substantially perpendicularly from the web, the bumper beam is made of a fully martensitic steel with a tensile strength between 1500 and 1900 MPa, the cover has a U-shaped cross section, the cover comprises a web and two legs extending substantially perpendicularly from the web, the legs of the cover are in contact with the legs of the bumper beam and the web of the cover is in contact with the web of the bumper beam, the cover extends beyond the bumper fastener, the cover extends up to the extremity of the bumper beam, the cover is made of a dual-phase steel with a tensile strength between 1180 and 1320 MPa, The present invention also relates to the motor vehicle body structure comprising a bumper-reinforcing system according to the invention and a motor vehicle comprising such system.

BRIEF DESCRIPTION OF THE DRAWINGS

Other features and advantages of the present invention will be better understood from a reading of the following description, given with reference to the appended drawings, in which.

DETAILED DESCRIPTION

Figure 1:
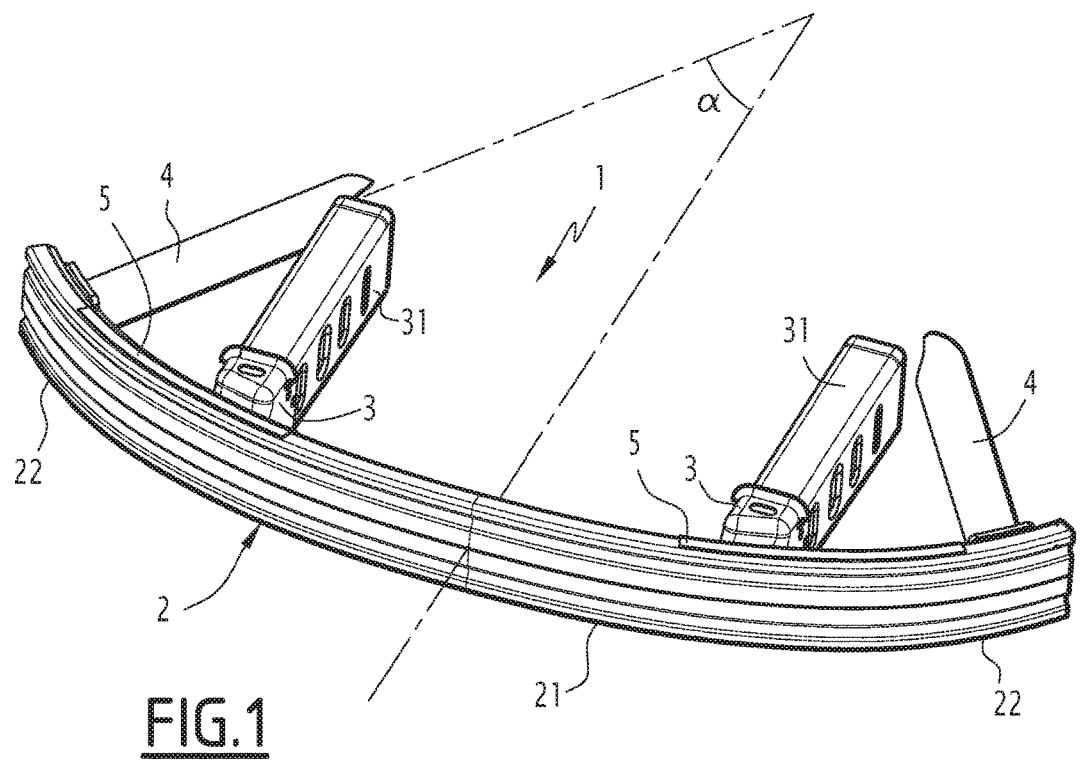
FIG. 1 is a perspective view of the bumper-reinforcing system according to the present invention.

Throughout all the figures, same or corresponding elements are generally indicated by same reference numerals.

In the following description, the terms inner, outer, front, rear, transversal, longitudinal, vertical and horizontal are construed with reference to the usual orientation of the illustrated elements, parts or structures when assembled on a vehicle structure.

As illustrated on FIG. 1, the bumper-reinforcing system 1 comprises a bumper beam 2, bumper fasteners 3, reinforcing tubes 4 and covers 5.

The bumper beam 2 includes a single-piece elongated profile having a closed cross section. It is suited to extend substantially from one side of the vehicle to the other side in the transversal direction. Thanks to the "single-piece" feature, the bumper beam does not present localized weak points. This allows maintaining the integrity of the bumper beam during a crash.

Preferentially, the profile is arched and, more particularly, convex towards the outer part of the vehicle for which the bumper-reinforcing system 1 is provided. This convexity improves the resistance to deformation of the bumper beam.

The bumper beam 2 includes a center zone 21 extending at least over part of the entire width of the bumper beam and an end zone 22 at each extremity of the bumper beam.

Thanks to the closed cross section, the bumper beam does not tend to open out during the impact. The resulting high inertia of the bumper beam contributes to a better absorption of energy.

Figure 2:
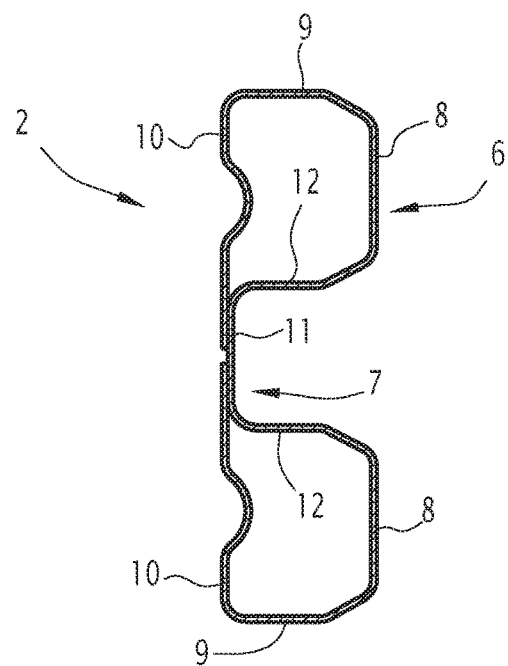
FIG. 2 is a cross section of the bumper beam according to the present invention.

According to one embodiment of the present invention illustrated on FIG. 2, the closed cross section of the bumper beam 2 is a "B-shaped" cross section. This cross section is based on a U-shaped gutter 6 which is convex towards the inner part of the vehicle for which the bumper system is provided.

The U-shaped gutter comprises a web 8 extending substantially vertically and two legs 9 respectively extending from the extremities of the web in substantially horizontal direction and pointing forward in the longitudinal direction. The depth of the U-shaped gutter 6 is constant alongside the length of the bumper beam.

The web 8 comprises a groove 7 spanning a portion of the width of the gutter and which is convex towards the outer part of the vehicle for which the bumper beam is provided. The groove comprises a web 11 extending substantially vertically and two legs 12 respectively extending from the extremities of the web 11 in substantially horizontal direction and pointing backward in the longitudinal direction. The depth of the groove 7 is constant alongside the length of the bumper beam.

The legs 9 of the U-shaped gutter are continued at their ends by flanges 10 which extend substantially vertically from the legs. The flanges are extending inwards from the legs. Preferentially, their extremities are in contact with the groove 7 so as to improve the resistance to deformation of the bumper beam. Preferentially, the two flanges lie in the same plane.

Optionally, the flanges can be reinforced thanks to stiffeners.

The legs 9 and 12 form horizontal walls extremely resistant to bending in the horizontal direction. Such walls increase the inertia of the bumper beam.

According to other embodiments of the present invention, the bumper beam 2 can have other closed cross sections, depending on the requested inertia. The cross section can for example comprise one main U-shaped gutter 6 and several grooves 7.

The bumper beam 2 is made in a first material having a high strength so that the bumper beam well resist to deformation. This might be steel.

In one preferred embodiment, this first material is a fully martensitic steel. For example, the fully martensitic steel has a yield strength comprised between 1200 and 1700 MPa and a tensile strength comprised between 1500 and 1900 MPa. Such martensitic steel is a good compromise between easy shaping process by profiling, mechanical performances and weight reduction. The combination of the closed cross section and the fully martensitic steel grade improves the resistance of the bumper beam while allowing the absorption of a part of the crash energy thanks to the high inertia. It also improves the transmission of the impact loads on the crash boxes.

The first material may be uncoated or coated, for example galvannealed or galvanized by any suitable process such as hot dip coating, electrodeposition, vacuum coating.

The bumper beam 2 is preferentially made of uniform material so as to facilitate its shaping.

The bumper beam 2 is preferentially obtained by roll-forming. Any other suitable process compatible with the grade of the first material is nevertheless possible.

The bumper-reinforcing system 1 also comprises bumper fasteners 3 connected, for example by welding, to the rear side of the bumper beam 2 at the intersection between the center zone 21 and the end zone 22 of the bumper beam 2. These bumper fasteners are suited to link the bumper beam to the front rails 32 of the motor vehicle, preferentially through the crash boxes 31 of the car, or through the crush tips 31 in the case of a pick-up truck.

Figure 3:
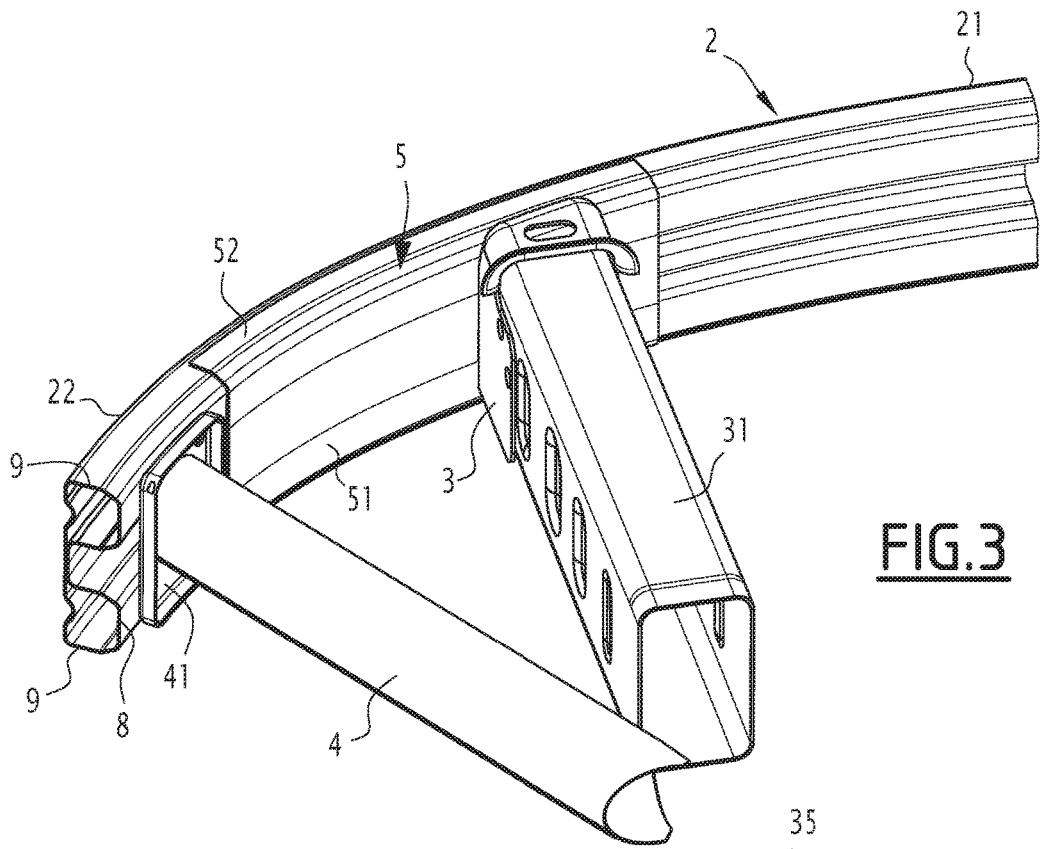
FIG. 3 is a perspective view of a part of the bumper-reinforcing system according to the present invention.

The shape of these bumper fasteners is not limited. According to one embodiment of the present invention illustrated on FIG. 3, these are caps with elongated walls in the longitudinal direction so as to more uniformly transmit the crash energy from the bumper beam to the head of the crash box or crush tip. According to other embodiments of the present invention, the bumper fasteners can be bolts or simply welds connecting the bumper beam to the front rails, generally through the crash boxes.

The bumper-reinforcing system 1 also comprises at least two reinforcing tubes 4 connected, by one of their end, to the rear side of each end zone of the bumper beam, preferentially through a connection part 41.

Figure 4:
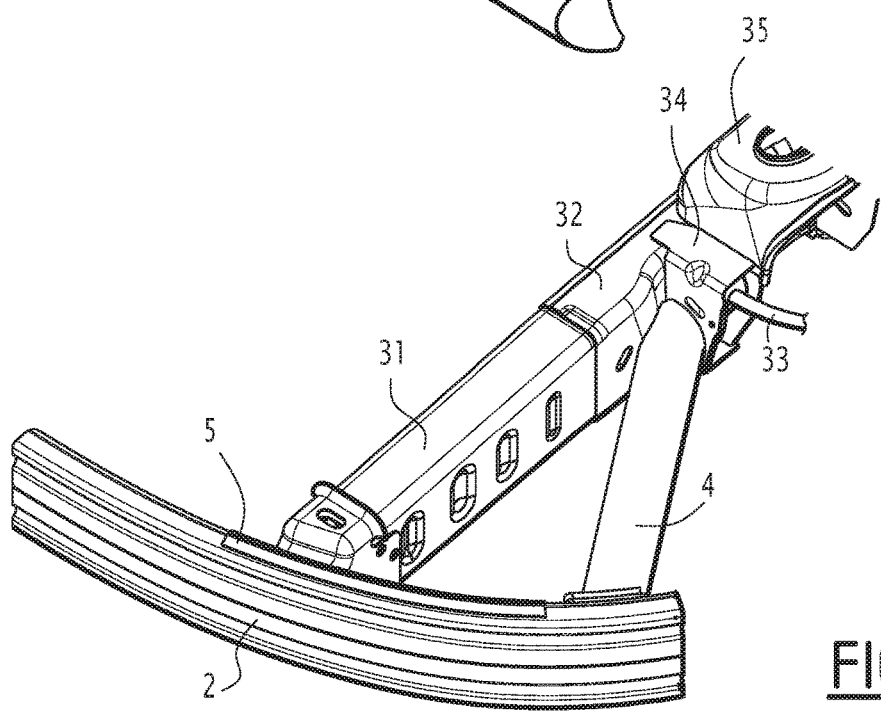
FIG. 4 is a perspective view of the connection of the reinforcing tube on the front rail.

The reinforcing tubes are suited to be connected, by their rear end, on the front rail 32, for example by welding. They are preferentially connected on the front part of the latter and more preferentially at the junction between the front rail and the A-arm 33 of the suspension of the motor vehicle for which the bumper-reinforcing system 1 is intended, as illustrated on FIG. 4. More preferentially, the reinforcing tubes are connected at the junction between the front rail and the suspension arm bracket 34. This bracket extends outwards from the front rail so that the junction front rail/bracket is L-shaped, so that the reinforcing tubes are connected in the trough of the L. Such connection of the reinforcing tubes benefits from the solidity of this junction and limits the weight increase. In particular, in case of crash, the transversal component of the effort transmitted by the reinforcing tube is absorbed by the suspension arm bracket 34 and the spring tower 35 located just beneath the suspension arm bracket, without bending of the front rail.

In one preferred embodiment, the front end of the reinforcing tube does not protrude from the end of the bumper beam in the longitudinal direction of the bumper beam. This improves the load transmission from the bumper beam to the reinforcing tube.

The reinforcing tube 4 is preferentially a hollow tube having a circular cross section. Such cross section can be done easily by profiling. It also presents a high resistance to compression and has a stable behavior in compression. Nevertheless other cross sections are possible within the frame of the present invention.

Preferentially, the reinforcing tube is not curved or angled inwards in the transversal direction so as to minimize the transversal component of the effort transmitted by the reinforcing tube on the front rail during a crash.

Preferentially, the surface of the reinforcing tube does not comprise any trigger and/or stiffener so as to minimize the risk of tube crushing at an early stage of the collision.

The connection part 41 is fixed, for example by welding, on one end of the reinforcing tube. According to one embodiment of the present invention illustrated on FIG. 3, this connection part mainly consists of a plate larger than the circular cross section of the reinforcing tube, so as to allow bolting the connection part on the bumper beam and to increase the contact surface between the bumper beam and the reinforcing tube so as to spread the efforts on the bumper beam.

The reinforcing tube 4 extends from the bumper beam 2 in substantially horizontal direction and pointing backward in the longitudinal direction. The reinforcing tube 4 forms an angle α below 45° with the vertical plane of symmetry of the bumper beam, i.e. an angle α below 45° with the front rail. Preferentially, the angle α is comprised between 20 and 35°. Thanks to this orientation of the reinforcing tube, the latter works more efficiently in compression and the risks of early crushing during the collision are minimized. Moreover, this orientation limits the transversal component of the effort transmitted by the reinforcing tube on the front rail during a crash.

In case of a small overlap rigid barrier crash, since the rear face of the bumper beam is supported at each end by the reinforcing tubes, it is possible to strongly limit the bending of the end zones. Therefore, the end zone does not bend at an early stage of the impact and the direct contact between the rigid barrier and the wheel is avoided, which would allow the rigid barrier to force the wheel rearwards into the firewall. Moreover, the load is better transmitted to the crash boxes. It is thus possible to efficiently absorb the impact caused by the collision.

The reinforcing tube 4 is made in a second material having a high strength so as to reinforce the resistance to deformation of the bumper beam 2. This might be steel.

In one preferred embodiment, this second material is a dual-phase steel. For example, the dual-phase steel has a yield strength comprised between 450 and 550 MPa and a tensile strength comprised between 780 and 900 MPa. Such grade is a good compromise between easy forming and high strength after forming. Furthermore, the combination of the tubular shape and this dual-phase steel is a good compromise between improved resistance to deformation and limited weight increase.

The second material may be uncoated or coated, for example galvannealed or galvanized by any suitable process such as hot dip coating, electrodeposition, vacuum coating.

The rear face of each end zone 22 is at least partially covered with a cover 5 so as to increase the inertia of the end zones. The cover as a single-piece elongated profile with an open cross section. The cover has preferentially a U-shaped cross section with a web 51 extending substantially vertically and two legs 52 respectively extending from the extremities of the web in substantially horizontal direction and pointing forward in the longitudinal direction. The dimensions of the cover are such that the web 51 and legs 52 of the cover are in contact with the bumper beam. In particular, the legs 52 of the cover are in contact with the legs 9 of the bumper beam and the web 51 of the cover is in contact with the web 8 of the bumper beam.

The legs 52 form additional horizontal walls, similar to the legs 9 and 12 of the bumper beam, which increase the inertia of the end zone.

The cover 5 extends at least from the first end of the reinforcing tube to the bumper fastener, in particular from the inner edge of the tube 4, more particularly from the inner edge of the connection part 41 of the tube, up to the inner edge of the bumper fastener 3.

At an early stage of the collision, the increase of inertia afforded by the cover improves the load transmission to the crash boxes or crush tips. It is thus possible to more efficiently absorb the impact caused by the collision. Then the cover maintains the integrity of the end zone and allows a strong contact of the end zone with the wheel so as to guide the wheel path during the collision. This better limits the risk of intrusion of the wheel in the occupant compartment.

In one preferred embodiment, the cover 5 extends beyond the inner edge of the bumper fastener 3, the extension being inwards in the transversal direction. The length of extension is preferentially of the order of magnitude of the height of the bumper beam. Thanks to this extension, the bending and the failure of the bumper beam in the area of the extremity of the crash box or crush tip 31 is better countered. Moreover, thanks to this extension, the bumper fastener 3 is connected, for example by welding, to the cover instead of being connected to the bumper beam so that the integrity of the latter is not jeopardized at the level of the bumper fastener. Moreover, the cover can thus be connected to the bumper beam beyond the inner edge of the bumper fastener where the latter is less exposed to the crash forces.

In one preferred embodiment, the cover 5 also extends up to the extremity of the bumper beam. Thanks to this extension, the bending and the failure of the bumper beam in the area of the extremity of the reinforcing tube is better countered. In this case, the cover is inserted between the bumper beam 2 and the extremity of the tube 4.

In one preferred embodiment, the cover 5 does not protrude from the end of the bumper beam in the longitudinal direction of the bumper beam. This improves the resistance of this end and the load transmission from the bumper beam to the reinforcing tube.

The cover 5 is made in a third material having a high strength so as to reinforce the resistance to deformation of the bumper beam 2. This might be steel.

In one preferred embodiment, this third material is a dual-phase steel. For example, the dual-phase steel has a yield strength comprised between 900 and 1100 MPa and a tensile strength comprised between 1180 and 1320 MPa. This steel grade combines a high resistance to deformation with high ductility and high total elongation. Furthermore, the combination of the cover design and this dual-phase steel is a good compromise between improved resistance to deformation and limited weight increase.

The third material may be uncoated or coated, for example galvannealed or galvanized by any suitable process such as hot dip coating, electrodeposition, vacuum coating.

The cover 5 can be obtained by roll-forming or by any other suitable process such as bending or stamping.

According to one embodiment of the present invention, the bumper-reinforcing system 1 comprises front rails 32 connected to the bumper fasteners, preferentially through the crash boxes or crush tips. These front rails are elongated profiles extending in the longitudinal direction of the vehicle for which the bumper-reinforcing system is provided. Preferentially, each front rail is obtained by welding of two different steel hardenable sheets. It mainly comprises a front part in a steel grade efficiently absorbing the residual impact energy transmitted by the crash boxes or crush tips and a rear part in a steel grade offering a high protection against intrusion. The front part and the rear part are made of two blanks assembled by laser welding and formed by hot stamping.

The front part is preferentially made of steel having a tensile strength comprised between 450 and 1150 MPa and a total elongation above 8%, preferentially between 8 and 25%. More preferentially, the steel microstructure comprises at least 75% of equiaxed ferrite, 5 to 25% of martensite and less than 10% of bainite. Still more preferentially, the steel composition comprises 0.04 to 0.1 wt % of C, 0.3 to 2 wt % of Mn, less than 0.3 wt % of Si, less than 0.08 wt % of Ti and 0.015 to 0.1 wt % of Nb. An example of such steel is Ductibor® 500.

Thanks to this steel grade, the front rail more efficiently absorbs the energy that has not been transmitted by the end zones of the bumper beam on the crash boxes or crush tips and that is transmitted through the reinforcing tube on the front rail.

The rear part is preferentially made of a fully martensitic steel, obtained by hot stamping/press hardening, with a tensile strength comprised between 1400 and 2000 MPa and a carbon content comprised between 0.15 and 0.5 wt %. An example of such steel is Usibor® 1500.

Thanks to this steel grade, the risks of intrusion in the occupant compartment are highly reduced.

While the present invention has been described in detail in connection with only a limited number of embodiments, it should be readily understood that the invention is not limited to such disclosed embodiments. Even though the description was related primarily to a bumper-reinforcing system for use across a front of a motor vehicle, it could alternatively be configured for use across a rear of a motor vehicle. In this case, all described features are respectively inverted in relation to the longitudinal direction.

The invention claimed is:

1. A bumper-reinforcing system for a motor vehicle, the bumper-reinforcing system comprising:
   a bumper beam with a single-piece elongated profile with a closed cross section and including a center zone extending at least over part of a width of the bumper beam and an end zone at each extremity of the bumper beam;
   two bumper fasteners connected to a rear side of the bumper beam at intersections between the center zone and the end zones of the bumper beam; two front rails connected to the bumper fasteners and two suspension arm brackets extending outwardly from the front rails;
   two reinforcing tubes connected by a respective first end to the rear side of the bumper beam at a respective end zone, the reinforcing tubes extending from the bumper beam so as to form an angle α below 45° with a vertical plane of symmetry of the bumper beam and suited to be connected by an other end on a respective front rail of the front rails, the front rails being provided for the bumper-reinforcing system; and
   two covers with a single-piece elongated profile with an open cross section, in contact with the rear side of the bumper beam at the end zones and extending at least from the first end of one of the reinforcing tubes to one of the bumper fasteners,
   the reinforcing tubes being connected by the other end at a junction of the respective front rail of the front rails and a respective suspension arm bracket of the suspension arm brackets,
   the front rail comprising a front part made of steel having a tensile strength comprised between 450 and 1150 MPa and a total elongation above 8% and a rear part made of a fully martensitic steel, obtained by press hardening, with a tensile strength comprised between 1400 and 2000 MPa and a carbon content comprised between 0.15 and 0.5 wt %.

2. A bumper-reinforcing system for a motor vehicle, the bumper-reinforcing system comprising:
   a bumper beam with a single-piece elongated profile with a closed cross section and including a center zone extending at least over part of a width of the bumper beam and an end zone at each extremity of the bumper beam;
   two bumper fasteners connected to a rear side of the bumper beam at intersections between the center zone and the end zones of the bumper beam; two front rails connected to the bumper fasteners and two suspension arm brackets extending outwardly from the front rails;
   two reinforcing tubes connected by a respective first end to the rear side of the bumper beam at a respective end zone, the reinforcing tubes extending from the bumper beam so as to form an angle α below 45° with a vertical plane of symmetry of the bumper beam and suited to be connected by an other end on a respective front rail of the front rails, the front rails being provided for the bumper-reinforcing system; and
   two covers with a single-piece elongated profile with an open cross section, in contact with the rear side of the bumper beam at the end zones and extending at least from the first end of one of the reinforcing tubes to one of the bumper fasteners,
   the reinforcing tubes being connected by the other end at a junction of the respective front rail of the front rails and a respective suspension arm bracket of the suspension arm brackets.

3. The bumper-reinforcing system as recited in claim 2 wherein the reinforcing tubes do not protrude from an end of the bumper beam in a longitudinal direction of the bumper beam.

4. The bumper-reinforcing system as recited in claim 2 wherein the reinforcing tubes are made of a dual-phase steel with a tensile strength between 780 and 900 MPa.

5. The bumper-reinforcing system as recited in claim 2 wherein the reinforcing tubes are hollow tubes having a circular cross section.

6. The bumper-reinforcing system as recited in claim 2 wherein the bumper beam has a B-shaped cross section.

7. The bumper-reinforcing system as recited in claim 2 wherein the bumper beam comprises a web and two legs extending perpendicularly from the web.

8. The bumper-reinforcing system as recited in claim 2 wherein the bumper beam is made of a fully martensitic steel with a tensile strength between 1500 and 1900 MPa.

9. The bumper-reinforcing system as recited in claim 2 wherein the covers have a U-shaped cross section.

10. The bumper-reinforcing system as recited in claim 9 wherein the covers comprise a web and two legs extending perpendicularly from the web.

11. The bumper-reinforcing system as recited in claim 10 wherein the bumper beam comprises a bumper web and two bumper legs extending perpendicularly from the bumper web, and wherein the legs of the cover are in contact with the bumper legs and the web of the cover is in contact with the bumper web.

12. The bumper-reinforcing system as recited in claim 2 wherein the covers extend beyond the bumper fasteners.

13. The bumper-reinforcing system as recited in claim 2 wherein the covers extend up to an extremity of the bumper beam.

14. The bumper-reinforcing system as recited in claim 2 wherein the covers are made of a dual-phase steel with a tensile strength between 1180 and 1320 MPa.

15. A motor vehicle body structure comprising:
the bumper-reinforcing system as recited in claim 2.

16. A motor vehicle comprising:
the bumper-reinforcing system as recited in claim 2.

* * * * *